United States Patent [19]

Shashaty

[11] 4,345,860
[45] Aug. 24, 1982

[54] BORING MACHINE AND METHOD OF RIGIDIZING A BORING BAR

[76] Inventor: Alex Shashaty, 41562 Lodge Rd., Leetonia, Ohio 44431

[21] Appl. No.: 168,599

[22] Filed: Jul. 14, 1980

[51] Int. Cl.³ ............................ B23B 35/00; B23B 51/08
[52] U.S. Cl. ............................................. 408/1 R; 408/8; 408/25; 82/2 E
[58] Field of Search ................ 408/1 R, 8, 18, 238 R, 408/241 R, 705, 22–25; 82/2 E

[56] References Cited

U.S. PATENT DOCUMENTS

| | | | |
|---|---|---|---|
| 2,625,060 | 1/1953 | Cudini | 408/8 |
| 2,903,917 | 9/1959 | Carlstedt | 408/8 |
| 4,154,555 | 5/1959 | Skrentner | 408/25 |

*Primary Examiner*—Leonidas Vlachos
*Attorney, Agent, or Firm*—Carothers and Carothers

[57] ABSTRACT

In a boring machine having an elongated rotating boring bar for internal end boring of elongated workpieces, the boring bar is rigidized during initial internal boring operations by clamping the workpiece in axial alignment with the axially rotating elongated boring bar and the boring bar is radially clamped intermediate its ends with a clamp which rotates with the rotating bar to rigidize the bar during initial boring operations. After initial end boring of the workpiece, the clamp is radially retracted and the boring operation is continued on the workpiece to a depth beyond the position of previous clamping on the boring bar.

10 Claims, 3 Drawing Figures

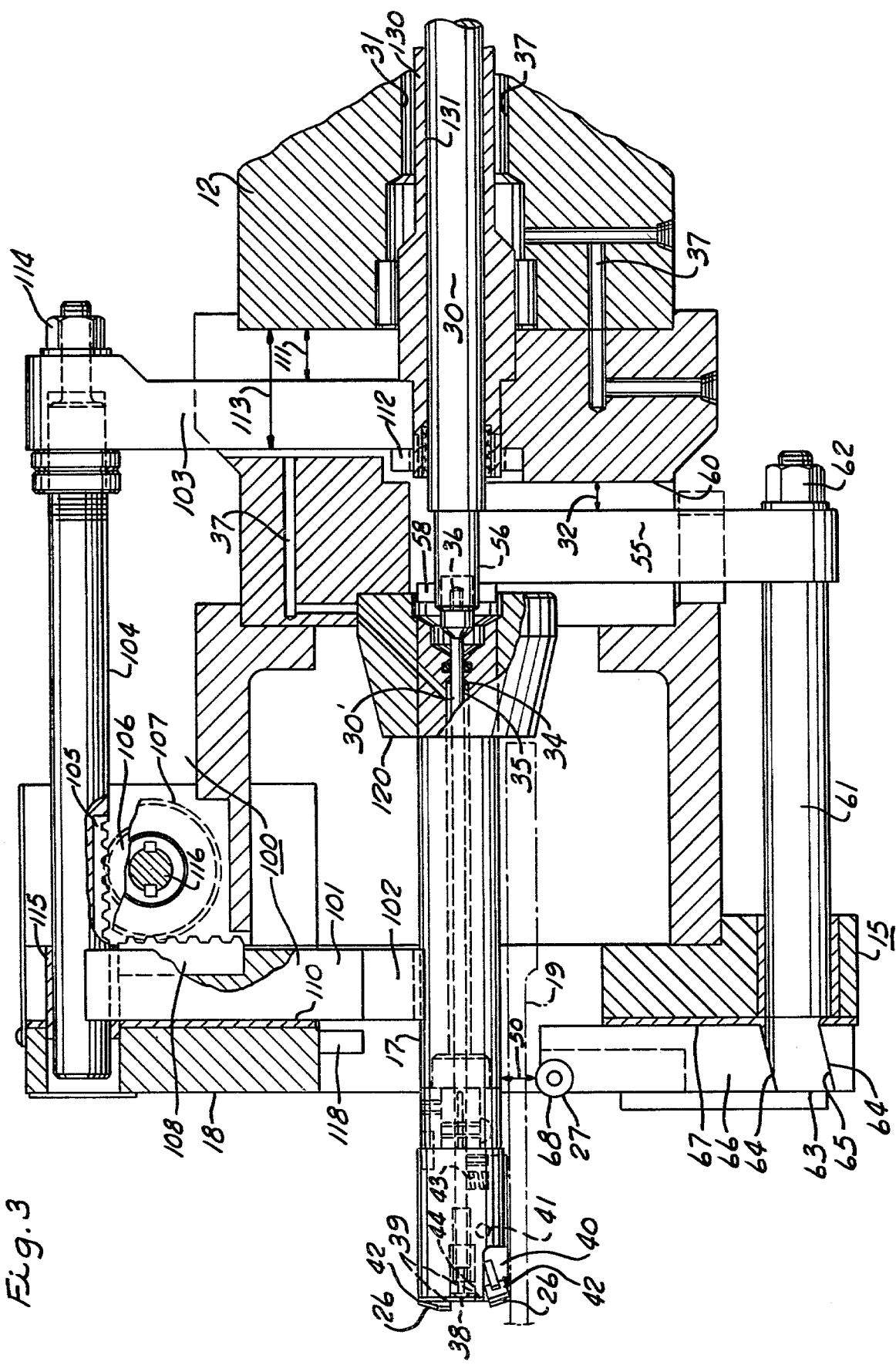

BORING MACHINE AND METHOD OF RIGIDIZING A BORING BAR

BACKGROUND OF THE INVENTION

This invention relates generally to boring machines, and more particularly to boring machines having elongated boring bars for internal end boring of a pipe end or other elongated workpieces.

Many elongated workpieces such as pipes, tubing, or rods, have to be end bored internally before use. For example, referring to my co-pending U.S. Pat. Application Ser. No. 20,366 which was filed on Mar. 14, 1979, for Method and Apparatus For Simultaneously Boring and Turning Upset Pipe Ends, now U.S. Pat. No. 4,289,430 issued Sept. 15, 1981 it is therein described that many pipes, when manufactured, have upset or thickened pipe ends which must have their inside and outside diameters machined or bored and turned before they can be used in the field to connect adjacent pipe sections. In that application, I describe a novel machine which simultaneously bores and turns such upset pipe ends.

When internally end boring such elongated workpieces as upset pipe ends, it is necessary to utilize an elongated boring bar having cutting or boring tools on the boring or free end thereof. Due to the length and flexibility of the boring bar and of the workpiece being bored, the boring bar, and for that matter, the workpiece, chatter and vibrate during initial end boring operations causing inaccurate boring cuts and excessive wear and damage to the boring tools and the inside surface of the workpiece being bored. In an attempt to avoid this problem, many boring machines of the prior art have incorporated boring bars which are made of special rigid metal. However, such boring bars are excessively expensive and in addition they do not totally solve the problem, as chattering or vibration on initial boring nevertheless still occurs, even if to a lesser degree.

A more recent attempt to solve this problem was carried out by using an axially slidable rigidizing collar which is coaxially carried over the boring bar and slid rearwardly or axially along the boring bar by the pipe end as the end boring operation advances. In this prior art apparatus, a cylindrical housing is coaxially mounted over and spaced from the boring bar, and rotates with the boring bar, then a sleeve is slidably received coaxially over the boring bar between the cylindrical housing and the boring bar. This sleeve is provided with a snug sliding fit between it and the boring bar and the sleeve and the outer cylindrical housing so that the sleeve during initial end boring operations of an elongated workpiece may be advanced very close to the free or boring end of the boring bar to rigidly hold or stabilize the boring bar during initial end boring operations. As initial end boring of the elongated workpiece or pipe advances, the pipe end engages this sleeve and slides it rearwardly back against a fluid pressure thereby continually exposing more free end of the boring bar for advanced internal boring of the pipe end. While this mechanism does assist in helping to rigidize the boring bar during initial end boring operations, nevertheless, many deficiencies remain.

For example, the rigidizing sleeve coaxially received over the boring bar must be provided with necessary slide clearance between the sleeve and the bar, and it can be readily seen that with continued use, the clearance necessarily becomes larger with wear, thereby permitting the bar to vibrate or chatter. In addition, dirt, metal cuttings, etc. find their way into this clearance causing the sleeve to slidably bind onto the boring bar, thereby causing maintenance, down time, and the boring bar surface becomes scarred after use. A scarred boring bar will eventually have to be replaced and will also cause the situation wherein the rigidizing sleeve will again bind on the scarred bar surface.

With such prior art boring machines, it must also be remembered that the pipe end being bored is stationary while the boring head together with the rigidizing sleeve are rotating. This means that a bearing surface must additionally be provided between the rotating face of the rigidizing sleeve where the pipe end butts up against it. It is thus obvious that end finishing or premachining of the end of the pipe is desirable in order to minimize this problem, thus requiring additional costly machining operations preparatory to end finishing of the pipe.

Another problem encountered with this boring machine of the prior art is that the coaxially slidable rigidizing sleeve previously explained must coaxially slide over the boring bar for practically its entire length and therefore there is no room on the machine behind the boring head to mount other pipe end facing and/or chamfering tools on the machine head for successive machining operations on the pipe end. Thus, this machine of the prior art makes it necessary to utilize additional expensive machinery for such end facing and chamfering operations.

It is a principal object of the present invention to completely eliminate these aforedescribed disadvantages of the prior art.

SUMMARY OF THE INVENTION

The present invention provides a means for rigidizing an elongated rotating boring bar during initial internal boring operations of a pipe end or other elongated workpieces by clamping the workpiece in axial alignment with an axially rotating elongated boring bar having a boring tool on one end thereof for boring the workpiece, and then the rotating elongated boring bar is radially clamped intermediate its ends with a clamp which rotates with the rotating bar to rigidize the bar during initial boring operations of the workpiece. The rotating boring bar and the workpiece are axially engaged to thereby initially end bore the workpiece, and thereafter the clamping means is radially retracted from the bar and the axial end boring operation of the workpiece is continued to a depth beyond the position of previous clamping on the bar.

In this manner, the bar may be clamped as tight as possible, and dirt or metal cuttings will not scar the bar or otherwise interfere with the rigidizing or clamping operation. There is no clearance problems such as found with the aforedescribed mechanism of the prior art, as there is zero clearance between the clamp means of the present invention and the boring bar, and many other end finishing operations, such as facing, chamfering, etc. may be carried out on the same machine as the clamping means of the present invention is retracted radially completely out of the way so that other tools for end finishing may be mounted near the base of the boring bar.

To describe the boring machine of the present invention is more detail, the boring machine consists generally of a support frame, a spindled journal for rotation on its axis in the frame, a motor in rotary driving engagement with this spindle, and a boring bar axially aligned with and secured at one end to one end of the spindle. Boring tools are provided on the other or free end of the boring bar for inside end boring of an elongated workpiece. Radially retractable clamp means are also rotatably carried by one end of the aforesaid spindle for radially clamping the boring bar intermediate its ends to rigidly support the bar during initial boring operation on an elongated workpiece. This clamp means is adapted for outward radial retraction to coaxially pass the workpiece end being internally bored over the bar past the clamp means after completion of initial boring operations. The clamp means rotatably carried by the end of the spindle generally consists of a heavy cylindrical type housing with the clamping mechanism contained therein. This heavy housing gives the clamping means very solid or rigid support to in turn solidly and very rigidly support the boring bar.

A plurality of bar clamping jaws are slidably received and uniformly radially disposed in the clamp support housing for radially advancing to engage and clamp the bar, and a motor means such as hydraulic fluid under pressure in combination with gear means or the like is utilized to advance and retract the jaws respectively, and usually simultaneously, radially into and out of clamping engagement with the boring bar.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 3 is a sectional view in side elevation of the combination boring and turning head illustrated in FIG. 2 as seen in section along section line III—III.

DETAILED DESCRIPTION OF THE DRAWINGS

For a general understanding of the operation of the basic machine illustrated in the Figures, reference should be made to my co-pending U.S. patent application Ser. No. 20,366 filed Mar. 14, 1979 for Method and Apparatus for Simultaneously Boring and Turning Upset Pipe End, which discloses basically the same combination boring and turning machine as disclosed herein with the exception of the additional inventive features added thereto and disclosed herein.

Figure 1:
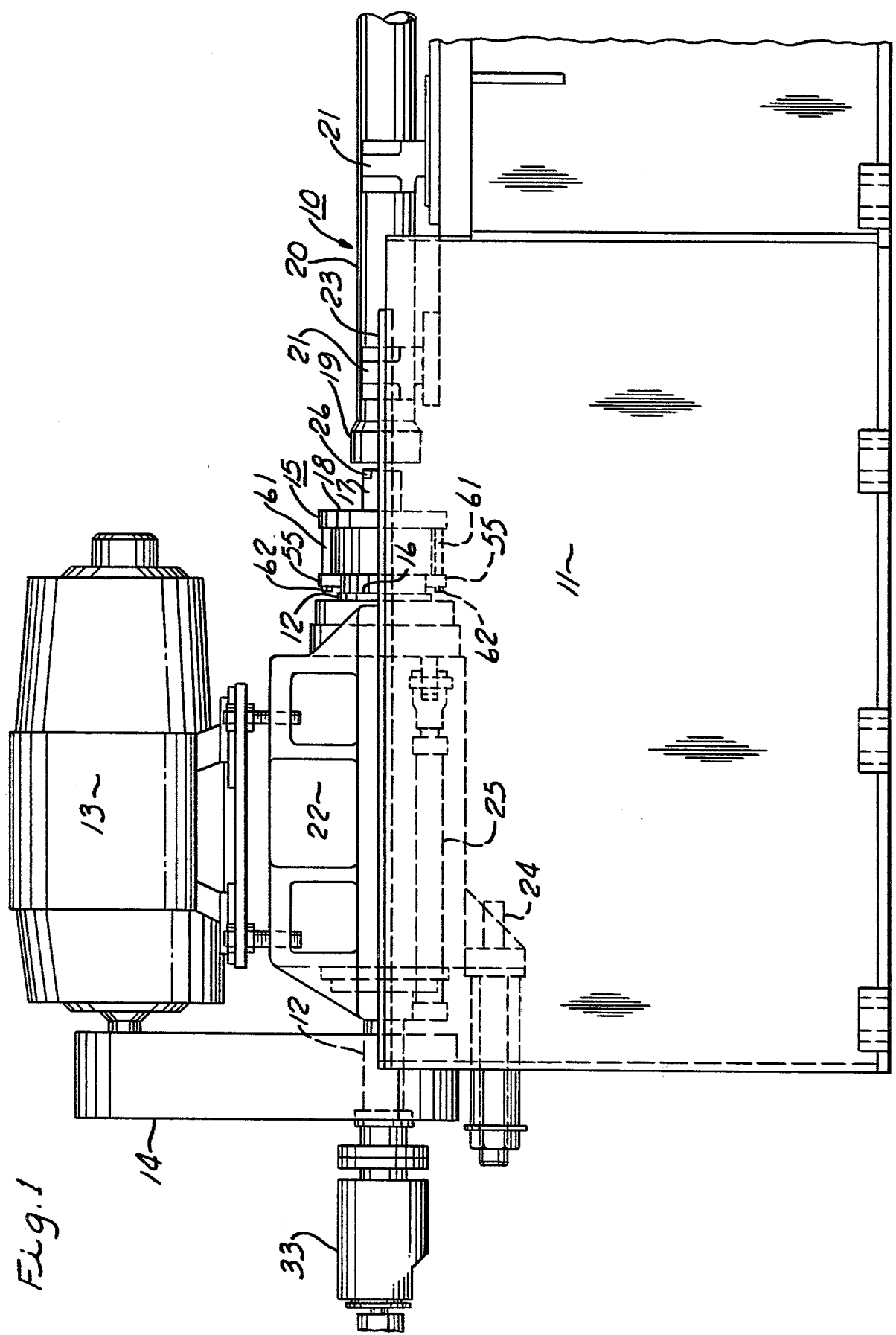
FIG. 1 is a view in side elevation illustrating a combination boring and turing machine for upset pipe ends which incorporates the mechanism of the present invention for rigidizing the boring bar. Portions of the view have been sectioned away for convenience.

Referring to FIG. 1, the combination boring and turning machine 10 generally comprises support frame 11 having an elongated spindle 12 journaled for rotation on its axis in the frame with a motor 13 mounted on the frame and in rotary driving engagement with the spindle 12 via a conventional pulley-sheave drive enclosed within housing 14. Motor 13 is a variable speed DC motor.

A combination pipe end boring and turning head 15 is secured to the face 16 of drive spindle 12. Head 15 consists of an elongated pipe end inside boring bar 17, having cutting or boring tools 42 carried on the free end thereof, which bar is axially aligned with and secured to the end of spindle 12, and a pipe end outside turning head and boring bar clamp support housing 18 which is also secured to the end of spindle 12 and coaxially positioned over the boring head 17 with a clearance therebetween to coaxially receive upset pipe end 19 for simultaneously boring and turning. Pipe 20 is clamped in pipe jaws 21 which are conventionally hydraulically actuated to rigidly secure pipe 20 for the boring and turning operation after it has been properly positioned in relation to the head 15.

In order to advance the rotating combination boring and turning head 15 axially into boring and turning engagement with upset pipe end 19, spindle 12 is mounted in a portion of frame support 11 in the form of a motor driven carriage 22 which traverses left and right in the figure along tracks 23 and is further limited in its forward movement by adjustable screw stop 24. Carriage 22 is shown in its full retracted position, and, of course, combination boring and turning head 15 therewith, or to the full left as viewed in the figure, prior to boring and turning engagement with pipe end 19.

Pipe 20 and spindle 12 are axially aligned with each other and, as previously stated, spindle 12 and head 15 therewith are rotated by motor 13 which rides on top of carriage 22. Thus, when carriage 22 is driven forward or to the right in the figure by hydraulic cylinders 25 in the axial direction of the spindle, the boring and turning head 15 will be driven into a slow feed boring and turning engagement with pipe end 19. In this manner, the outside diameter and the inside diameter of pipe end 19 are simultaneously machined.

Figure 2:
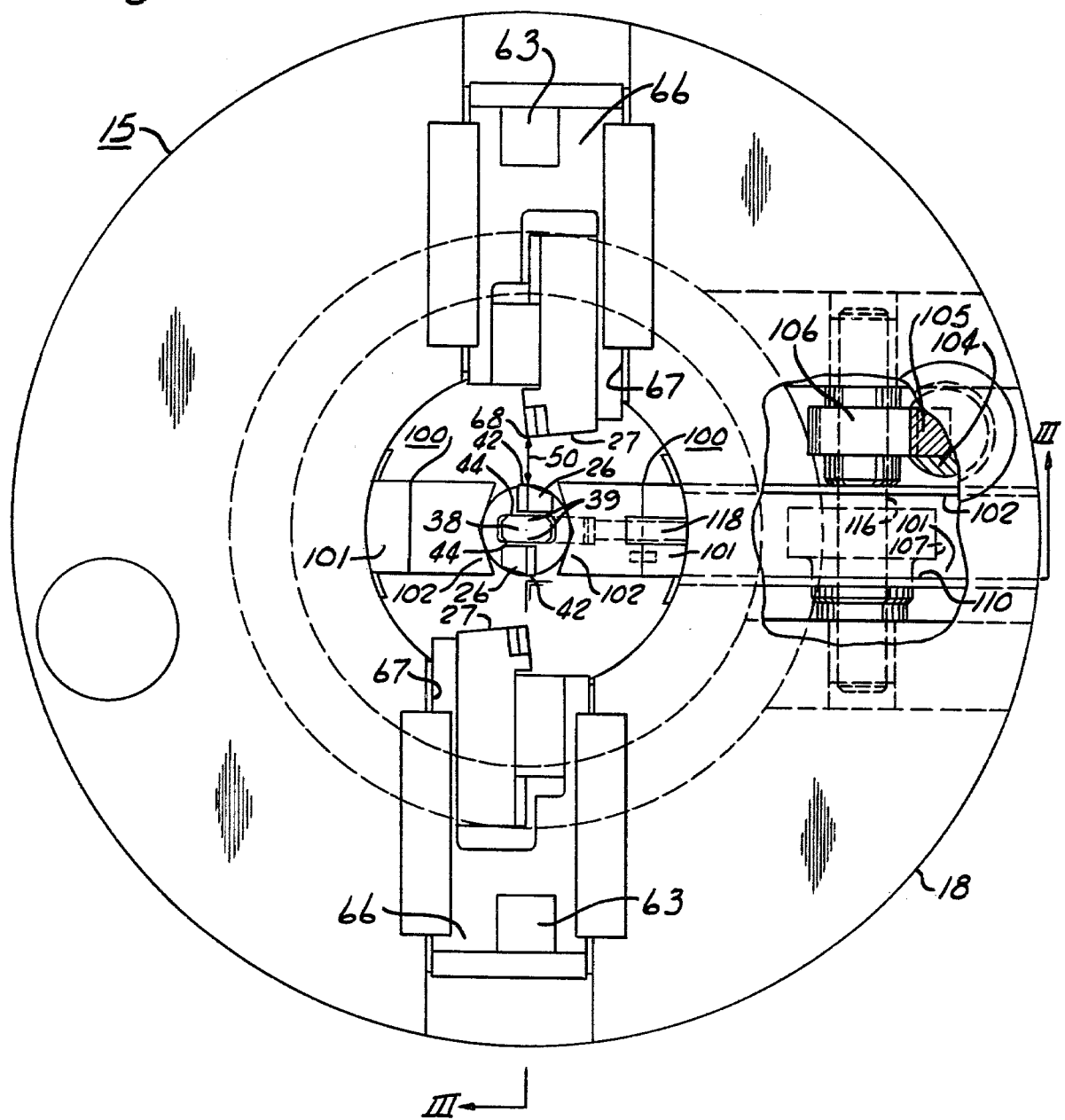
FIG. 2 is a view in front elevation of the combination boring and turning head utilized in the machine illustrated in FIG. 1.

Referring, in addition to FIGS. 2 and 3, boring bar 17 and turning head and clamp support housing 18 are respectively provided with radially retractable pipe end boring tools 26 and cutters 27. Boring tools 26 retract by collapsing radially inward and turning tools 27 are retracted by being simultaneously expanded radially outward. Pull rod 30 is utilized to simultaneously retract boring tools 26 and turning tools 27. Pull rod 30 is coaxially received within spindle 12 in bore 31 which axially penetrates the entire spindle. Pull rod 30 rotates with spindle 12, but it also is axially slidable within bore 131 of hollow pull rod 130, which is in turn axially slidable within bore 31, for the stroke length indicated by arrow 32. Pull rod 30 is axially retracted or advanced relative to spindle 12 by means of hydraulic cylinder 33 (FIG. 1). Pull rod 30 is also provided with an extension 30' which is slidably received in axial bore 34 of boring bar 17 with a specially provided clearance 35 which will be explained hereinafter. Pull rod extension 30' is secured to the forward end of pull rod 30 by the threaded engagement indicated at 36.

A cam head 38 is secured to the forward end of extension pull bar 30' and is provided with two slanted cam surfaces 39. The cutting tools 26 are in turn biased radially inward against these cam surfaces 39 such that when pull rod 30 and extension pull rod 30' therewith are retracted to the rear or right in FIG. 3, boring tools 26 will collapse radially inward.

Boring tools 26 consist of bar-like cutter cartridges 40 which are pivotally secured in their central area to boring head 17 by means of dowel pins 41. The forward end of cartridges 40 carry replaceable cutter inserts 42 which actually engage and cut the inside diameter of the pipe. The rearward ends of cartridges 40 are continually urged radially outward by compression springs 43 such that the forward ends of cartridges 40 are always urged under the pressure of spring 43 radially inward due to the pivot effect about dowel pins 41.

Cam followers 44 are threadably and adjustably received in the forward inside ends of cartridges 40 and they continually ride against cam surfaces 39 of cam head 38 under the bias of springs 43. Cam followers 44 may be threadably adjusted in or out to correctly position cutter inserts 42.

When pull rod 30 and extension rod 30' therewith are retracted, cam followers 44 follow the inward incline of cam surfaces 39 thereby collapsing the cutting tools 26.

As previously indicated, pull rod 30' is provided with bore clearance 35 for the supply of air or air and mist lubricant under pressure for cooling or lubrication to the forward end of bore head 17 via passages 37.

Boring bar 17 is rigidly secured to turning head and clamp support housing 18 which is in turn rigidly secured to the forward face of spindle 12. Housing 18 is coaxially positioned relative to boring head 17 with clearance 50 therebetween to receive the pipe end 19 therebetween for simultaneous boring and turning.

A transverse arm 55 is received on the reduced forward end 56 of pull rod 30 and secured rigidly to pull rod 30 by means of nut 58. Arm 55 extends transversely through open passages or slots 60 in combination head 15 and thus transverse arm 55 slides to the left or right in unison with pull rod 30 within the clearance 32.

Two pull rods 61 have their rearward ends respectively secured to opposite ends of arm 55 by means of nuts 62. The forward ends of pull rods 61 are each provided with a cam head 63 which has side cam surfaces 64. Cam head 63 is slidably received in cam follow slot 65 of cam followers 66. Cam followers 66 are permitted to slide radially in and out in guides 67 and carry therewith turning cutters 68.

Thus, when pull rod 30 is retracted rearward or to the right (in FIG. 3, left in FIG. 1), arm 55 and pull rods 61 are retracted therewith, thus causing cam follower slide blocks 66 to slide radially outward and carry cutters 68 with them to their retracted position. In this manner, it can be readily seen that boring cutter inserts 42 and turning cutters 68 are simultaneously retracted when pull rod 30 is retracted by means of the motor or hydraulic cylinder 33. The speed of retraction of cylinder 33 is regulated to be gradual when terminating the combination boring and turning operation in order to gradually taper out the ID and OD cuts and thereby eliminate sharp annular stop cut shoulders.

When the cutting tools 26 and 27 are thus fully retracted, carriage 22 is then quickly retracted to the left (FIG. 1) to axially disengage pipe end 19 from head 15 and the finished pipe is removed from clamps 21 and another pipe is inserted for the next operation.

Due to the fact that the boring and turning tools are fully retracted and no longer engage the tube 19, head 15 does not have to be retracted at a fine or slow feed rate as is employed when the boring and turning operation is being carried out, thereby eliminating back boring or otherwise scarring the already machined surfaces.

Describing next the inventive improvements with reference to FIGS. 2 and 3, radially retractable clamp means 11 is rotatably carried by spindle 12 as are the turning cutters 68 in housing 18. The clamp means 100 includes two clamping bars 101 having clamping jaws 102 illustrated in tight clamping engagement with boring bar 17 intermediate the ends thereof to rigidize boring bar 17 during initial boring operations of pipe end 19. Clamping bars 101 are slidably received in guides 102 of housing 18 for radial advancement inwardly to engage bar 17 and radial retraction away from bar 17 after initial end boring of pipe 19. Radial retraction or advancement of clamping bars 101 is accomplished by a motor means which basically includes hydraulic cylinder 33, pull rod 130, transverse arm 103, rack bars 104, rack 105, pinion gears 106 and 107, and clamp bar racks 108 together with clamp bar 101.

Hydraulic cylinder 33, as seen in FIG. 1, is provided with a hydraulic piston to retract or advance pull rod 130 axially relative to spindle 12 and pull rod 30, and to so retract or advance pull rod 130 independently of the axial position of pull rod 30 over which it coaxially slides. Thus, when pull rod 130 is axially advanced by hydraulic cylinder 33 to the left for full clamping engagement of bar 17 by jaws 102 as illustrated in FIGS. 2 and 3, transverse arm 103 also moves to the left for the distance indicated by arrow 111, since transverse arm 103 is secured to the forward end of pull rod 130 and secured thereto by means of nut 112. Transverse arm 103 is provided with slot clearance 113 for travel within housing 18 or head 15.

Rack rods 104 are in turn threadably secured by nuts 114 at opposite ends of transverse arm 103. Rack rods 104 are, in turn, slidably received in bearings 115 of housing 18. Gear racks 105 carried by rack rods 104 mesh with the smaller pinion gears 106 and thus when rack rods 104 advance to the left as viewed in FIG. 3, pinion gears 106 are rotated counterclockwise and since pinion gears 106 are, in turn, keyed to rotatable shafts 116, pinion shafts 116 also rotate, which in turn, further rotates larger pinion gears 107 therewith since they are also keyed to the pinion shafts 116.

Pinion gears 107 in turn mesh with clamp bar racks 108 which, in turn, are carried by clamp bars 101. Thus, when pinion gears 107 are rotated clockwise as illustrated in FIG. 3, clamp jaws 102 are simultaneously radially advanced into clamping engagement with elongated boring bar 17 to rigidize the same for additional boring operation. During initial end boring operations, jaws 102 are held in equal and very strong clamping engagement with bar 117 due to the fact that the hydraulic piston (not shown) in hydraulic cylinder 33 is continually under hydraulic pressure urging push rod 130 to the left as viewed in FIG. 3, In order to unclamp boring bar 17, the procedure is simply reversed by activating hydraulic cylinder 33 to hydraulically retract the piston which carries with it push rod 130 to simultaneously retract the clamping bars 101 radially outward from bar 17. To accomplish this clamping retraction operation automatically, a magnetically-sensitive (or mechanical) limit switch 118 is positioned on the inside of housing 18 just in advance of clamping bars 101 so that when the end of pipe 19 which is being bored comes under or in the proximity of limit switch 118, the limit switch is activated and, in turn, activates hydraulic cylinder 33 to retract pull rod 130 thereby also causing clamping bars 101 to radially retract to permit the passage of the pipe end 19 coaxially over bar 17 past the clamping position of clamping bar 101.

It can be seen that this clamping arrangement permits the interior 120 of head 15 to be completely free for the attachment or inclusion of other pipe end finishing tools such as facing and chamfering tools.

I claim:

1. A boring machine for boring pipe ends or other elongated workpieces comprising, a support frame, a boring bar secured at one end thereof to said frame and having boring tool means on its other or free end for inside boring of an elongated workpiece, drive means on said frame to provide relative boring rotation between a workpiece to be bored and said boring bar, and radially retractable clamp means carried by said frame for radially clamping said boring bar intermediate its ends to rigidly support said bar during initial boring operations on an elongated workpiece and adapted for outward radial retraction to coaxially pass a workpiece end being internally bored over said bar past said clamp means after completion of said initial boring operations, said drive means including a spindle journaled for rotation on its axis in said frame, a motor in rotary driving engagement with said spindle, said boring bar axially aligned with said spindle and said one end thereof secured to one end of said spindle, said radially retractable clamp means being rotatably carried by said one end of said spindle.

2. The boring machine of claim 1, said boring tool means comprising a radially retractable pipe end boring tool and means to retract said tool from boring engagement with a pipe end.

3. The boring machine of claim 2, including a pipe end outside turning head secured to said one end of said spindle and coaxially positioned over said boring head for clearance therebetween to coaxially receive a pipe end for simultaneous boring and turning, said turning head having a radially retractable turning tool, said means to retract said boring tool adapted to simultaneously retract said boring and turning tools from boring and turning engagement with said pipe end.

4. The boring machine of claim 3, wherein said radially retractable clamp means is carried by said pipe end outside turning head.

5. The boring machine of claim 1, said radially retractable clamp means including a clamp support housing secured to said one end of said spindle coaxially over said boring bar, a plurality of bar clamping jaws slidably received and uniformly radially disposed in said support housing for radially advancing to engage and clamp said bar, and motor means to advance and retract said jaws radially into and out of clamping engagement with said boring bar.

6. The boring machine of claim 5, wherein said motor means includes slide means in said support housing axially slidable by a prime mover, and gear means interconnecting said slide means with said clamping jaws to correspondingly radially move said jaws with axial sliding movement of said slide means.

7. The boring machine of claim 1, including means on said frame to clamp an elongated workpiece in axial alignment with said spindle, and means on said frame to axially advance said boring tool means into boring engagement with an end of said workpiece and to retract said boring means from said workpiece after boring.

8. The boring machine of claim 7, wherein said means to advance and retract includes a motor-driven carriage portion of said frame housing said spindle and movable along a track on said frame in the axial direction of said spindle to axially advance and retract said boring tool means relative to said workpiece.

9. A method of rigidizing an elongated boring bar during initial internal boring operations of a pipe end or other elongated workpieces comprising the steps of, clamping the workpiece in axial alignment with an elongated boring bar having a boring tool on one end thereof for boring said workpiece, radially clamping said elongated boring bar intermediate its ends with a clamp to rigidize said bar during initial boring operations of said workpiece, axially engaging said boring tool with said workpiece and axially rotating said clamp with said boring bar to thereby initially end bore said workpiece, thereafter radially unclamping said bar, and continuing the axial end boring operation of said workpiece to a depth beyond the position of previous clamping on said bar.

10. The method of rigidizing an elongated boring bar during initial internal boring operations of a pipe end or other elongated workpieces as set forth in claim 9, including the step of clamping said workpiece in axial alignment not only with said elongated boring bar, but also in axial alignment with an axially rotating outside diameter pipe end turning head having outside diameter cutters, the step of axially engaging said boring tool with said workpiece also including the step of simultaneously boring and turning a portion of said workpiece end, after the step of continuing the axial end boring operation of said workpiece to a depth beyond the position of previous clamping on said bar thereafter simultaneously retracting the boring tool radially inward and the outside diameter turning cutter radially outward out of engagement with said workpiece end, and then axially withdrawing said workpiece end.

* * * * *